(12) United States Patent
Oda et al.

(10) Patent No.: US 11,025,868 B2
(45) Date of Patent: Jun. 1, 2021

(54) IMAGING APPARATUS, REPRODUCING APPARATUS, CONTROL METHOD, AND CONTROL SYSTEM

(71) Applicant: SONY CORPORATION, Tokyo (JP)

(72) Inventors: Ryunosuke Oda, Tokyo (JP); Takeshi Harada, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/640,258

(22) PCT Filed: Jun. 14, 2018

(86) PCT No.: PCT/JP2018/022653
§ 371 (c)(1),
(2) Date: Feb. 19, 2020

(87) PCT Pub. No.: WO2019/049455
PCT Pub. Date: Mar. 14, 2019

(65) Prior Publication Data
US 2020/0382748 A1 Dec. 3, 2020

(30) Foreign Application Priority Data
Sep. 5, 2017 (JP) .............................. JP2017-169940

(51) Int. Cl.
*H04N 5/77* (2006.01)
*H04N 7/18* (2006.01)
*H04N 5/232* (2006.01)
*H04N 9/87* (2006.01)

(52) U.S. Cl.
CPC ......... *H04N 7/188* (2013.01); *H04N 5/23245* (2013.01); *H04N 9/87* (2013.01)

(58) Field of Classification Search
CPC ....... H04N 7/188; H04N 9/87; H04N 5/23245

USPC ........ 386/224, 226, 228, 229, 230, 248, 291
See application file for complete search history.

(56) References Cited

U.S. PATENT DOCUMENTS

| 2009/0074392 A1* | 3/2009 | Uenishi | H04N 5/232127 396/104 |
| 2015/0146031 A1* | 5/2015 | Kageyama | H04N 5/378 348/220.1 |

FOREIGN PATENT DOCUMENTS

| JP | 2005-159530 A | 6/2005 |
| JP | 2009-278432 A | 11/2009 |
| JP | 4406981 B2 | 2/2010 |
| JP | 2010-187379 A | 8/2010 |
| KR | 10-2010-0092210 A | 8/2010 |

OTHER PUBLICATIONS

International Search Report and Written Opinion of PCT Application No. PCT/JP2018/022653, dated Sep. 4, 2018, 7 pages of ISRWO.

* cited by examiner

*Primary Examiner* — Robert Chevalier
(74) *Attorney, Agent, or Firm* — Chip Law Group

(57) ABSTRACT

There is provided an imaging apparatus including an imaging unit that captures a moving image and a communication unit that performs wireless communication. The imaging apparatus further includes a control unit that controls an imaging function and a transmission function for transmitting an image signal indicating a captured image that has been captured, on the basis of a time setting set in advance. The control unit at least controls switching between a standby state where the imaging function is not working and an operating state where the imaging function is working, based on the time setting.

13 Claims, 8 Drawing Sheets

IMAGING APPARATUS, REPRODUCING APPARATUS, CONTROL METHOD, AND CONTROL SYSTEM

CROSS REFERENCE TO RELATED APPLICATIONS

This application is a U.S. National Phase of International Patent Application No. PCT/JP2018/022653 filed on Jun. 14, 2018, which claims priority benefit of Japanese Patent Application No. JP 2017-169940 filed in the Japan Patent Office on Sep. 5, 2017. Each of the above-referenced applications is hereby incorporated herein by reference in its entirety.

TECHNICAL FIELD

The present disclosure relates to an imaging apparatus, a reproducing apparatus, a control method, and a control system.

BACKGROUND ART

A technique for controlling a start of imaging in an imaging apparatus has been developed. As a technique for controlling a start of imaging in the imaging apparatus by using a detection result of motion between a current frame image and an adjacent frame image, and/or a detection result of motion between the current frame image and a reference frame image, for example, there is a technique described in Patent Document 1 below.

CITATION LIST

Patent Document

Patent Document 1: Japanese Patent Application Laid-Open No. 2009-278432

SUMMARY OF THE INVENTION

Problems to be Solved by the Invention

For example, in practice of athletic sports involving trial, such as trampolines, gymnastics, and snowboarding, there is a case where an image of trial is captured by an imaging apparatus, and a person performing practice checks a form or the like by watching the captured image (moving image or still image). For the captured image, the person performing practice is to view the captured image reproduced with a delay from the time of imaging. Therefore, reproduction of a captured image in which the captured image is reproduced with a delay from the time of imaging as described above is called "delayed reproduction".

However, there is a possibility that a system capable of realizing delayed reproduction impairs convenience for the following reasons described below, for example.
  There is a case where environments and conditions allowing the use are limited.
  It is not easy to use for people who do not have specialized knowledge (for example, players who practice, a practice staff, and the like)

The present disclosure proposes a new and improved imaging apparatus, reproducing apparatus, control method, and control system capable of realizing delayed reproduction with further improved convenience.

Solutions to Problems

According to the present disclosure, there is provided an imaging apparatus including: an imaging unit configured to capture a moving image; a communication unit configured to perform wireless communication; and a control unit configured to control an imaging function and control a transmission function for transmitting an image signal indicating a captured image that has been captured, on the basis of time setting set in advance. The above-described control unit at least controls switching between a standby state where the above-described imaging function is not working and an operating state where the above-described imaging function is working, in accordance with the above-described time setting.

Furthermore, according to the present disclosure, there is provided a reproducing apparatus including: a communication unit configured to perform wireless communication; a display unit capable of displaying an image on a display screen; and a control unit configured to control a reproduction function for reproducing a received image signal and displaying an image on the above-described display screen, on the basis of time setting set in advance or a detection result of a predetermined object.

Furthermore, according to the present disclosure, there is provided a control method to be executed by an imaging apparatus. The control method includes a control step of performing, on the basis of time setting set in advance, control of an imaging function in an imaging unit configured to capture a moving image, and control of a transmission function for transmitting an image signal indicating a captured image that has been captured in a communication unit. In the control step described above, at least switching between a standby state where the above-described imaging function is not working and an operating state where the above-described imaging function is working is controlled in accordance with the above-described time setting.

Furthermore, according to the present disclosure, there is provided a control method to be executed by a reproducing apparatus. The control method includes a step of controlling a reproduction function for reproducing an image signal received wirelessly in a communication unit and displaying an image on a display screen of a display unit, on the basis of time setting set in advance or a detection result of a predetermined object.

Furthermore, according to the present disclosure, there is provided a control system including an imaging apparatus and a reproducing apparatus. The above-described imaging apparatus includes: an imaging unit configured to capture a moving image; an imaging-apparatus-side communication unit configured to perform wireless communication; and an imaging-apparatus-side control unit configured to control an imaging function and control a transmission function for transmitting an image signal indicating a captured image that has been captured, on the basis of time setting set in advance. The above-described imaging-apparatus-side control unit at least controls switching between a standby state where the above-described imaging function is not working and an operating state where the above-described imaging function is working, in accordance with the above-described time setting. The above-described reproducing apparatus includes: a reproducing-apparatus-side communication unit configured to perform wireless communication; a display unit capable of displaying an image on a display screen; and a reproducing-apparatus-side control unit configured to control a reproduction function for reproducing a received image signal and displaying an image on the above-described display screen, on the basis of time setting set in advance or a detection result of a predetermined object.

Effects of the Invention

According to the present disclosure, delayed reproduction with further improved convenience can be realized.

Note that the effect described above is not necessarily limited, and in addition to the effect described above or instead of the effect described above, any of the effects described in this specification, or other effects that may be understood from the present specification may be exhibited.

MODE FOR CARRYING OUT THE INVENTION

Figure 1:
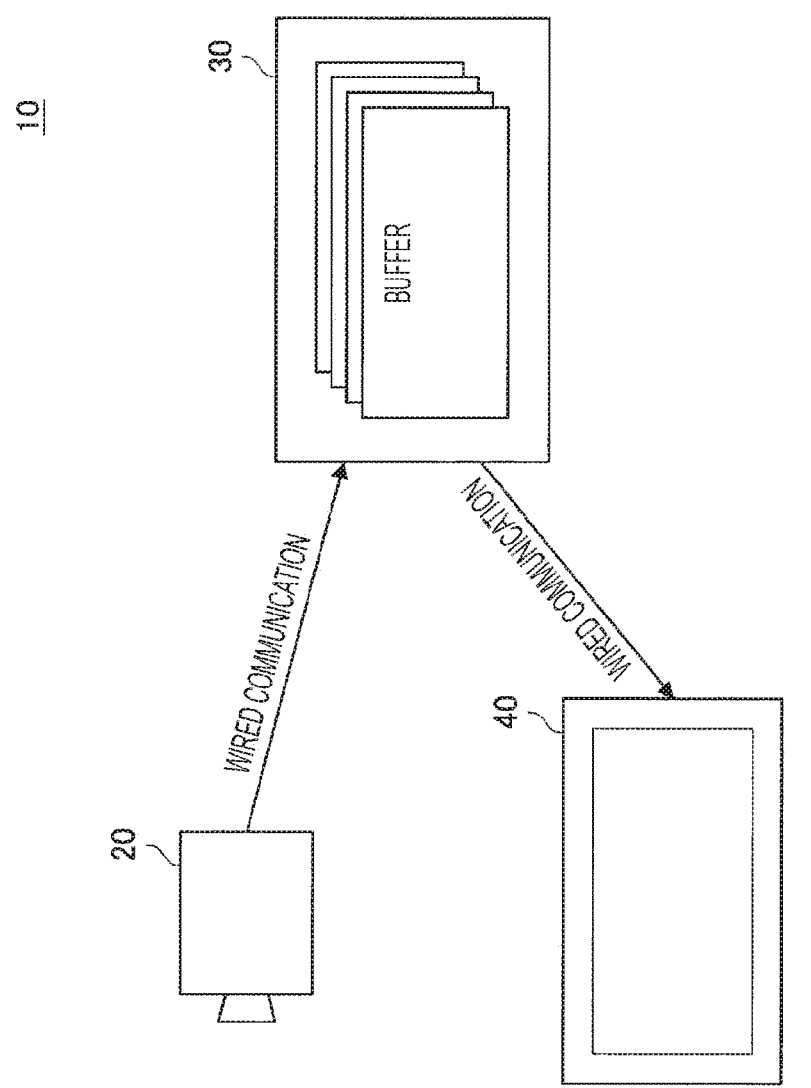
FIG. 1 is an explanatory diagram for explaining an example of a system capable of realizing delayed reproduction.
Figure 1:
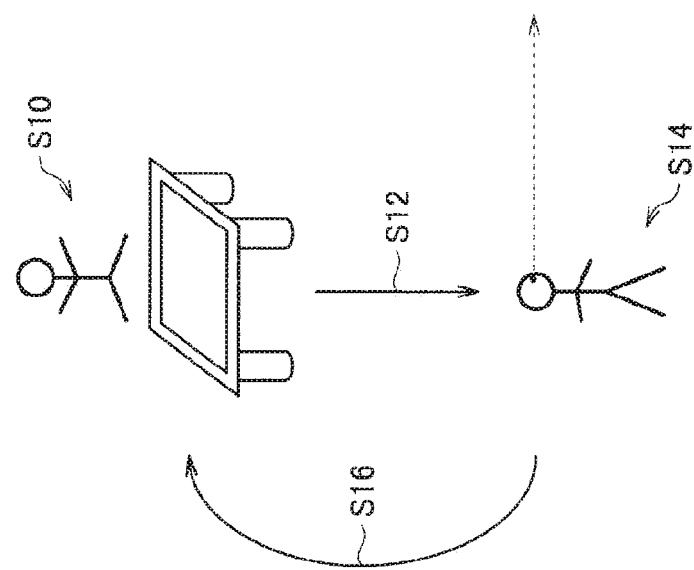

Hereinafter, a preferred embodiment of the present disclosure will be described in detail with reference to the accompanying drawings. Note that, in this specification and the drawings, components having substantially the same functional configuration are denoted by the same reference numerals, and redundant explanations are omitted.

Furthermore, in the following, a description will be given in the following order.

1. Control system according to present embodiment, and control method according to present embodiment
2. Program according to present embodiment

Control System According to Present Embodiment, and Control Method According to Present Embodiment

[1] Example of System Capable of Realizing Delayed Reproduction

In prior to describing a control system according to the present embodiment, an example of a system capable of realizing delayed reproduction will be described.

FIG. 1 is an explanatory diagram for explaining an example of a system capable of realizing delayed reproduction.

A system 10 shown in FIG. 1 includes an imaging apparatus 20, a buffer device 30, and a reproducing apparatus 40. FIG. 1 shows an example in which the reproducing apparatus 40 is an apparatus having a function of displaying an image.

The imaging apparatus 20 and the buffer device 30 are connected by wire, and an image signal indicating a captured image captured by the imaging apparatus 20 is transmitted to the buffer device 30 by wired communication and stored in the buffer device 30. In the system 10, an uncompressed image signal is transmitted from the imaging apparatus 20 to the buffer device 30. Furthermore, the buffer device 30 and the reproducing apparatus 40 are connected by wire, and the captured image stored in the buffer device 30 is transmitted to the reproducing apparatus 40 by wired communication and reproduced by the reproducing apparatus 40.

A use case in which the system 10 is used for practice of a trampoline will be described.

A person performing practice performs trial for a specified time (S10). After completing the trial, the person performing practice moves to a front of the display screen of the reproducing apparatus 40 (S12).

In the system 10, reproduction of the captured image stored in the buffer device 30 is started in accordance with timing when the person performing practice moves to the front of the display screen. The person performing practice who has moved to the front of the display screen checks a form and the like by watching the captured image reproduced by the reproducing apparatus 40 and displayed on the display screen (S14).

In the system 10, an amount (buffer amount) for storing the captured image in the buffer device 30 is determined, with a time period obtained by adding a trial time and a movement time as a delay time for delaying to reproduce the captured image. For example, when the trial time is three minutes and the movement time to the display screen is one minute, then, the person performing practice is to watch the captured image from four minutes ago. Therefore, in the system 10, delayed reproduction is realized.

The person performing practice after watching the reproduced captured image moves to the trampoline in order to perform the trial again (S16). Then, the person performing practice performs trial for a specified time (S10).

Here, in a system capable of realizing delayed reproduction, it is required that, once the system is activated, then, start and stop operations of various devices need not be performed every time the trial is performed. That is, the system capable of realizing delayed reproduction is required to have, for example, operability for allowing automatic operation and concentration on trial and instructions.

Therefore, the imaging apparatus 20, the buffer device 30, and the reproducing apparatus 40 continue to operate until, for example, an operation for ending the delayed reproduction is performed, in the system 10.

However, since various devices are large-scale in the system 10 as shown in FIG. 1, various devices are installed in a practice field. Therefore, in the system 10 as shown in FIG. 1, environments and conditions allowing the use are limited. For example, the system 10 as shown in FIG. 1 is installed, and thus is not portable and cannot be used at an expedition destination. It is also difficult to use the system 10 as shown in FIG. 1 in an outdoor athletics such as snowboarding.

Moreover, systems installed in practice fields require equipment setup and operation by specialists in many cases. Therefore, it is not easy for people who do not have specialized knowledge (for example, players who practice, a practice staff, and the like) to use the system 10 as shown in FIG. 1.

Here, as a system capable of solving the above-described problems that may occur in the system 10 shown in FIG. 1, for example, it may be considered "a system including: an imaging apparatus having a wireless communication function conforming to any given wireless communication standard such as the IEEE 802.11 standard; and a reproducing apparatus having a wireless communication function and a reproduction function, such as a tablet-type device". The reproduction function according to the present embodiment refers to, for example, "a function of reproducing an image signal and displaying an image on a display screen". In a case where the reproduction function according to the present embodiment works, an image signal is reproduced by being decoded, and the decoded image is displayed on the display screen.

Figure 2:
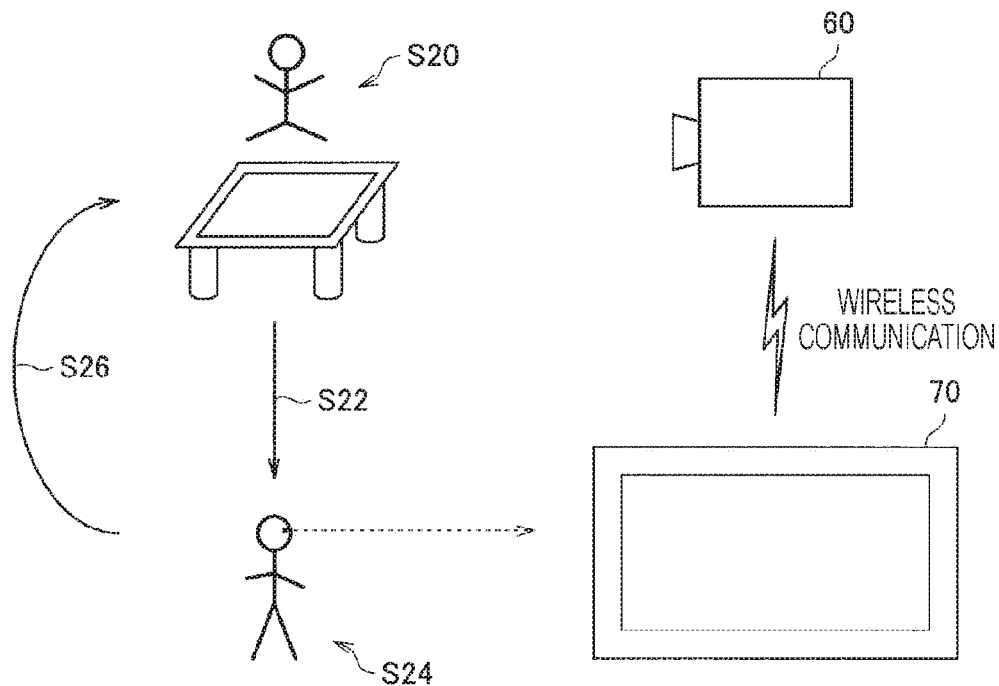
FIG. 2 is an explanatory diagram for explaining another example of the system capable of realizing delayed reproduction.

FIG. 2 is an explanatory diagram for explaining another example of the system capable of realizing delayed reproduction.

A system 50 shown in FIG. 2 includes an imaging apparatus 60 and a reproducing apparatus 70.

The imaging apparatus 60 has a function of performing wireless communication in addition to an imaging function, and wirelessly transmits an image signal indicating a captured image generated by imaging. Here, the transmission of the image signal by wireless communication in the imaging apparatus 60 corresponds to, for example, streaming transmission of an image.

The reproducing apparatus 70 has a function of performing a wireless communication function in addition to the reproduction function of an image, and displays an image indicated by an image signal received by the wireless communication on a display screen.

For example, in the system 50 shown in FIG. 2, an image signal indicating a captured image is transmitted from the imaging apparatus 60 to the reproducing apparatus 70 by the wireless communication and the captured image is reproduced by the reproducing apparatus 70.

Similarly to FIG. 1, a use case in which the system 50 is used for practice of a trampoline is taken as an example.

A person performing practice performs trial for a specified time (S20). After completing the trial, the person performing practice moves to a front of the display screen of the reproducing apparatus 70 (S22).

In the system 50, an image signal indicating a captured image received by the reproducing apparatus 70 by wireless communication is buffered, and reproduction of the captured image indicated by the buffered image signal is started in accordance with timing when the person performing practice moves to the front of the display screen. The person performing practice who has moved to the front of the display screen checks a form and the like by watching the captured image reproduced by the reproducing apparatus 70 and displayed on the display screen (S24).

In the system 50, an amount (buffer amount) for buffering the image signal by the reproducing apparatus 70 is determined, with a time period obtained by adding a trial time and a movement time as a delay time for delaying to reproduce the captured image. For example, when the trial time is three minutes and the movement time to the display screen is one minute, then, the person performing practice is to watch the captured image from four minutes ago. Therefore, in the system 50, delayed reproduction is realized similarly to the system 10.

The person performing practice after watching the reproduced captured image moves to the trampoline in order to perform the trial again (S26). Then, the person performing practice performs trial for a specified time (S20).

As described above, the system capable of realizing delayed reproduction is required to have operability for allowing automatic operation and concentration on trial and instructions is required. Therefore, in the system 50, the imaging apparatus 60 and the reproducing apparatus 70 continue to operate until, for example, an operation for ending the delayed reproduction is performed.

In the system 50, unlike the system 10 shown in FIG. 1, an image signal indicating a captured image is transferred by wireless communication. Therefore, wiring for communication as in the system 10 is not required, and setting up is easy. Furthermore, the system 50 can be configured with an imaging apparatus having a wireless communication function conforming to any given wireless communication standard such as the IEEE 802.11 standard, and with a reproducing apparatus having a wireless communication function and a reproduction function such as a tablet-type device. Therefore, a scale of each device can be made smaller than that of the system 10 shown in FIG. 1.

Therefore, the system 50 is portable and can be easily used at an expedition destination or used in outdoor athletics. Furthermore, for example, cameras and tablet-type devices having a wireless communication function conforming to the IEEE 802.11 standard are spreading, and players who practice can easily use these devices.

Here, each device included in the system 50 is provided with an internal power source such as a battery in order to have portability, and configured to operate with power supplied from the internal power source, in many cases. Therefore, each device operating with power supplied from the internal power supply has a limited operable time as compared with a case of operating with an external power supply such as a commercial power supply.

However, in the system 50, the imaging apparatus 60 and the reproducing apparatus 70 need to continue to operate in order to realize delayed reproduction. Therefore, the system 50 may be limited in usable time due to power consumption.

Therefore, it is difficult to say that the system 50 can realize delayed reproduction with improved convenience.

[2] Control System According to Present Embodiment

Therefore, the control system according to the present embodiment is to realize delayed reproduction with improved convenience by controlling a function of each device, while having a basic configuration similar to that of the system 50 in FIG. 2.

Hereinafter, a description is given to an example of the control system according to the present embodiment, and processing in each device included in the control system according to the present embodiment (processing related to a control method according to the present embodiment). Furthermore, in the following, a use case in which the control system according to the present embodiment is used for practice of a trampoline will be mainly given as an example.

Note that use cases to which the control system according to the present embodiment can be applied are not limited to the practice of a trampoline. The control system according to the present embodiment can be applied to practice of various athletic sports that involve trial, including practice of sports that involves indoor trial such as gymnastics, practice of sports that involves outdoor trial such as snowboarding and skiing, and the like. Furthermore, use cases to which the control system according to the present embodiment can be applied are not limited to being applied to practice of athletic sports as described above, but can be applied to any use case in which imaging of some action by an imaging apparatus and checking of a captured image may be repeatedly performed.

[2-1] Control System According to First Embodiment

Figure 3:
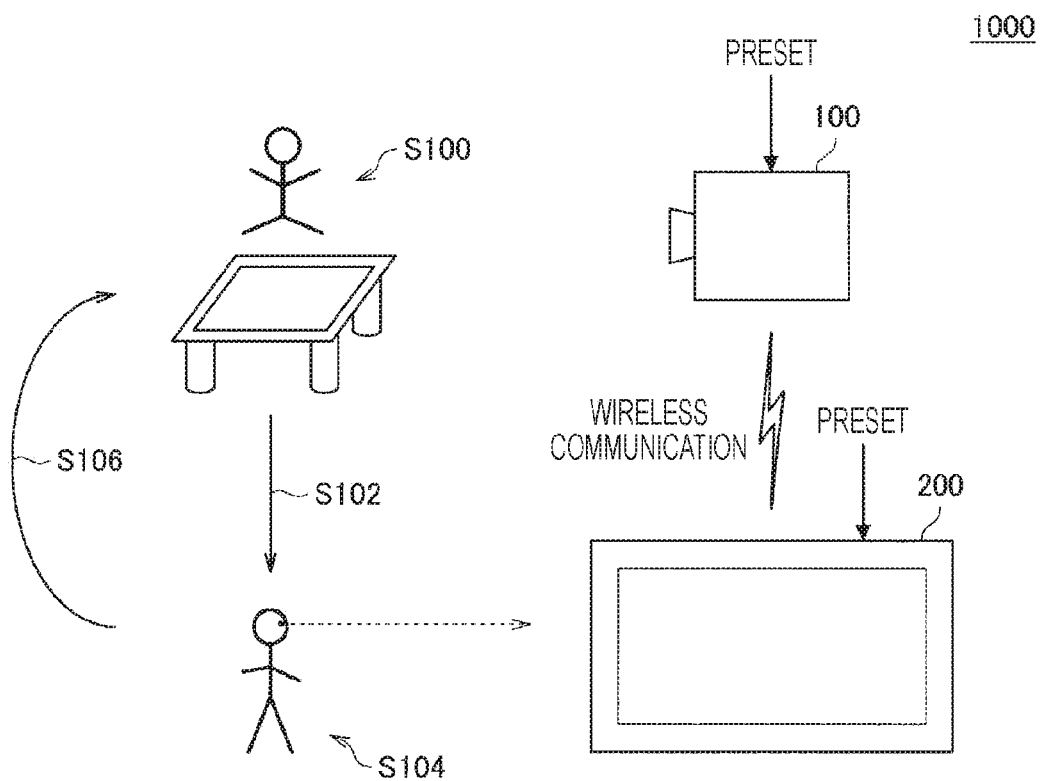
FIG. 3 is an explanatory diagram showing an example of a configuration of a control system according to a first embodiment.

FIG. 3 is an explanatory diagram showing an example of a configuration of a control system 1000 according to a first embodiment. The control system 1000 according to the first embodiment includes an imaging apparatus 100 and a reproducing apparatus 200. An example of a configuration of each of the imaging apparatus 100 and the reproducing apparatus 200 will be described later.

[2-1-1] Imaging Apparatus 100 According to First Embodiment

The imaging apparatus 100 has a function of performing wireless communication in addition to an imaging function, and wirelessly transmits an image signal indicating a captured image generated by imaging.

The imaging apparatus 100 may cause transmission of an image signal compressed in conformity with any given image compression standard such as H.264, for example. Since transmitting the compressed image signal from the imaging apparatus 100 enables further reduction of a memory capacity for buffering by the reproducing apparatus 200, for example, the scale of the reproducing apparatus 200 can be further reduced.

The imaging apparatus 100 controls an imaging function and controls a transmission function for transmitting an image signal indicating a captured image, on the basis of time setting set in advance.

Examples of the time setting in the imaging apparatus 100 include, for example, one or both of setting of a time interval from a start to a stop of imaging, and setting of a time interval from a start to a stop of transmission. Since the time setting according to the present embodiment is the time interval between a start and a stop as described above, the imaging apparatus 100 realizes a periodic operation for each of imaging and transmission.

Note that the time setting in the imaging apparatus 100 is not limited to the example shown above. For example, the time setting in the imaging apparatus 100 may be one or both of setting of an imaging start time and an imaging stop time, and setting of a transmission start time and a transmission stop time. In a case where the time setting in the imaging apparatus 100 is each time of a start and a stop as described above, a periodic operation or a non-periodic operation is realized for each of imaging and transmission, by setting a plurality of sets of the start time and the stop time.

Data indicating the time setting in the imaging apparatus 100 is stored in, for example, a storage unit (described later) provided to the imaging apparatus 100, or a recording medium such as an external recording medium connected to the imaging apparatus 100. Then, the imaging apparatus 100 performs control based on the time setting, by reading the data indicating the time setting from the recording medium. Hereinafter, the fact that the time setting in the imaging apparatus 100 is set in advance may be referred to as "preset".

More specifically, the imaging apparatus 100 controls the imaging function so as to periodically start and stop imaging in accordance with the time setting, for example. Here, the start of imaging in the imaging apparatus 100 refers to, for example, being in an operating state where the imaging function of the imaging apparatus 100 is working. Furthermore, the stop of imaging in the imaging apparatus 100 refers to, for example, being in a standby state where the imaging function of the imaging apparatus 100 is not working. That is, the imaging apparatus 100 controls switching between the standby state of the imaging function and the operating state of the imaging function in accordance with the time setting. Furthermore, a captured image is generated when imaging is started, and a captured image is not generated when imaging is stopped.

Furthermore, the imaging apparatus 100 controls the imaging function so as to periodically start and stop transmission of an image signal in accordance with the time setting, for example. Here, the start of transmission in the imaging apparatus 100 refers to, for example, being in an operating state where the transmission function of the imaging apparatus 100 is working. Furthermore, the stop of transmission in the imaging apparatus 100 refers to, for example, being in a standby state where the transmission function of the imaging apparatus 100 is not working. That is, the imaging apparatus 100 controls switching between the standby state of the transmission function and the operating state of the transmission function in accordance with the time setting. Furthermore, an image signal indicating a captured image is transmitted by wireless communication when transmission is started, and an image signal is not transmitted by wireless communication when transmission is stopped.

Examples of the time setting related to control of the imaging function and the time setting related to control of the transmission function include, for example, same setting. Furthermore, there may be a time difference between the time setting related to control of the imaging function and the time setting related to control of the transmission function. For example, the time setting related to control of the transmission function may be set to be delayed from the time setting related to control of the imaging function, by a time interval required to generate a captured image (for example, a time period until encoded image data is generated).

For example, as described above, by setting the time setting related to control of the imaging function and the time setting related to control of the transmission function, and controlling the imaging function and the transmission function in accordance with the time setting, "a captured image is transmitted when the imaging is performed, and the transmission of the image signal is stopped when the imaging is stopped" is realized in the imaging apparatus 100.

By periodically stopping imaging and transmission in accordance with the time setting in the imaging apparatus 100, power consumption in the imaging apparatus 100 is reduced. Furthermore, in a case where a state where imaging and transmission in the imaging apparatus 100 are stopped is a standby state of the imaging apparatus 100 (a state of operating with standby power set when the imaging apparatus 100 is designed and the like), the power consumption in the imaging apparatus 100 is reduced to standby power. The standby state of the imaging apparatus 100 refers to a state of the imaging apparatus 100 where each of the imaging function and the transmission function is in the standby state.

[2-1-2] Reproducing Apparatus 200 According to First Embodiment

The reproducing apparatus 200 has a function of performing a wireless communication function in addition to the reproduction function of an image, and displays an image indicated by an image signal received by the wireless communication on a display screen.

The reproducing apparatus 200 controls the reproduction function on the basis of time setting set in advance. The reproduction function according to the present embodiment refers to, for example, a function of reproducing a received image signal and displaying an image on a display screen. In the reproducing apparatus 200, the reproduction function works to decode the image signal and display the decoded image on the display screen.

Examples of the time setting in the reproducing apparatus 200 include, for example, setting of a time interval from a start to a stop of reproduction. Since the time setting according to the present embodiment is the time interval between a start and a stop as described above, the reproducing apparatus 200 realizes a periodic reproduction operation.

Note that the time setting in the reproducing apparatus 200 is not limited to the example shown above. For example, the time setting in the reproducing apparatus 200 may be setting of a reproduction start time and a reproduction stop time. In a case where the time setting in the reproducing apparatus 200 is each of the start time and the stop time as described above, a periodic reproduction operation or a non-periodic reproduction operation is realized by setting a plurality of sets of the start time and the stop time.

Data indicating the time setting in the reproducing apparatus 200 is stored in, for example, a storage unit (described later) provided to the reproducing apparatus 200 or a recording medium such as an external recording medium connected to the reproducing apparatus 200. Then, the reproducing apparatus 200 performs control based on the time setting, by reading the data indicating the time setting from the recording medium. Hereinafter, the fact that the time setting in the reproducing apparatus 200 is set in advance may be referred to as "preset".

More specifically, the reproducing apparatus 200 controls the reproduction function so as to periodically start and stop reproduction in accordance with the time setting, for example. Here, the start of reproduction in the reproducing apparatus 200 refers to, for example, being in a state where the reproduction function of the reproducing apparatus 200 is working.

Furthermore, the stop of reproduction in the reproducing apparatus 200 refers to, for example, being in a state where the reproduction function of the reproducing apparatus 200 is not working. That is, for example, a captured image received by wireless communication and decoded is displayed on the display screen when reproduction is started, and decoding and display of the captured image are not performed when reproduction is stopped.

By periodically stopping reproduction in accordance with the time setting in the reproducing apparatus 200, power consumption in the reproducing apparatus 200 is reduced. Furthermore, in a case where a state where reproduction in the reproducing apparatus 200 is stopped is a standby state of the reproducing apparatus 200 (a state of operating with standby power set when the reproducing apparatus 200 is designed and the like), the power consumption in the reproducing apparatus 200 is reduced to standby power.

[2-1-3] Use Case of Control System 1000 According to First Embodiment

Similarly to FIGS. 1 and 2, a use case in which the control system 1000 is used for practice of a trampoline is taken as an example.

A person performing practice performs trial for a specified time (S100). After completing the trial, the person performing practice moves to a front of the display screen of the reproducing apparatus 200 (S102).

In the control system 1000, an image signal indicating a captured image received by the reproducing apparatus 200 by wireless communication is buffered, and reproduction of the captured image indicated by the buffered image signal is started in accordance with timing when the person performing practice moves to the front of the display screen. The person performing practice who has moved to the front of the display screen checks a form and the like by watching the captured image reproduced by the reproducing apparatus 200 and displayed on the display screen (S104).

An amount (buffer amount) for buffering the image signal by the reproducing apparatus 200 is determined, for example, in a similar manner to the reproducing apparatus 70 shown in FIG. 2. For example, when a trial time is three minutes and a movement time to the display screen is one minute, then, the person performing practice is to watch the captured image from four minutes ago. Therefore, in the control system 1000, delayed reproduction is realized similarly to the system 50 shown in FIG. 2.

The person performing practice after watching the reproduced captured image moves to the trampoline in order to perform the trial again (S106). Then, the person performing practice performs trial for a specified time (S100).

As described above, the imaging apparatus 100 controls each of the imaging function and the transmission function on the basis of the time setting. Furthermore, the reproducing apparatus 200 controls the reproduction function on the basis of the time setting. Therefore, the power consumption of each of the imaging apparatus 100 and the reproducing apparatus 200 is reduced from the power consumption of each of the imaging apparatus 60 and the reproducing apparatus 70 shown in FIG. 2.

Each of the time setting set for the imaging apparatus 100 and the time setting set for the reproducing apparatus 200 is determined by, for example, a trial time interval (time interval corresponding to step S100) according to contents of the trial and an environment in which the trial is performed, a movement time interval to the display screen of the reproducing apparatus 200 (time interval corresponding to step S102), and a movement time interval (time interval corresponding to step S106) for performing the trial again. Note that, since the reproduction time interval in the reproducing apparatus 200 (time interval corresponding to step S104) is similar to the trial time interval (time interval corresponding to step S100) according to contents of the trial and an environment in which the trial is performed, the setting can be omitted.

Since each of the imaging apparatus 100 and the reproducing apparatus 200 operates on the basis of the set time setting, it is possible to realize that "each of the imaging apparatus 100 and the reproducing apparatus 200 continues to operate, for example, until an operation for ending the delayed reproduction is performed" in the control system 1000. Therefore, the control system 1000 can realize "operability for allowing automatic operation and concentration on trial and instructions".

[2-1-4] Example of Effects Exhibited by Control System 1000 According to First Embodiment A basic configuration of the control system 1000 is similar to the configuration of the system 50 in FIG. 2. Therefore, the control system 1000 can exhibit effects similar to those of the system 50 in FIG. 2.

Furthermore, the imaging apparatus 100 controls each of the imaging function and the transmission function on the basis of the time setting, and the reproducing apparatus 200 controls the reproduction function on the basis of the time setting. Therefore, the power consumption of each of the imaging apparatus 100 and the reproducing apparatus 200 is reduced from the power consumption of each of the imaging apparatus 60 and the reproducing apparatus 70 shown in FIG. 2.

Furthermore, by reducing the power consumption of each of the imaging apparatus 100 and the reproducing apparatus 200, a person who uses the control system 1000 according to the first embodiment can use the control system 1000 for a longer time than a case of using the system 50 in FIG. 2, even in a case where each of the imaging apparatus 100 and the reproducing apparatus 200 operates with an internal power supply.

Therefore, the control system 1000 according to the first embodiment can realize delayed reproduction with further improved convenience.

[2-2] Control System According to Second Embodiment

Figure 4:
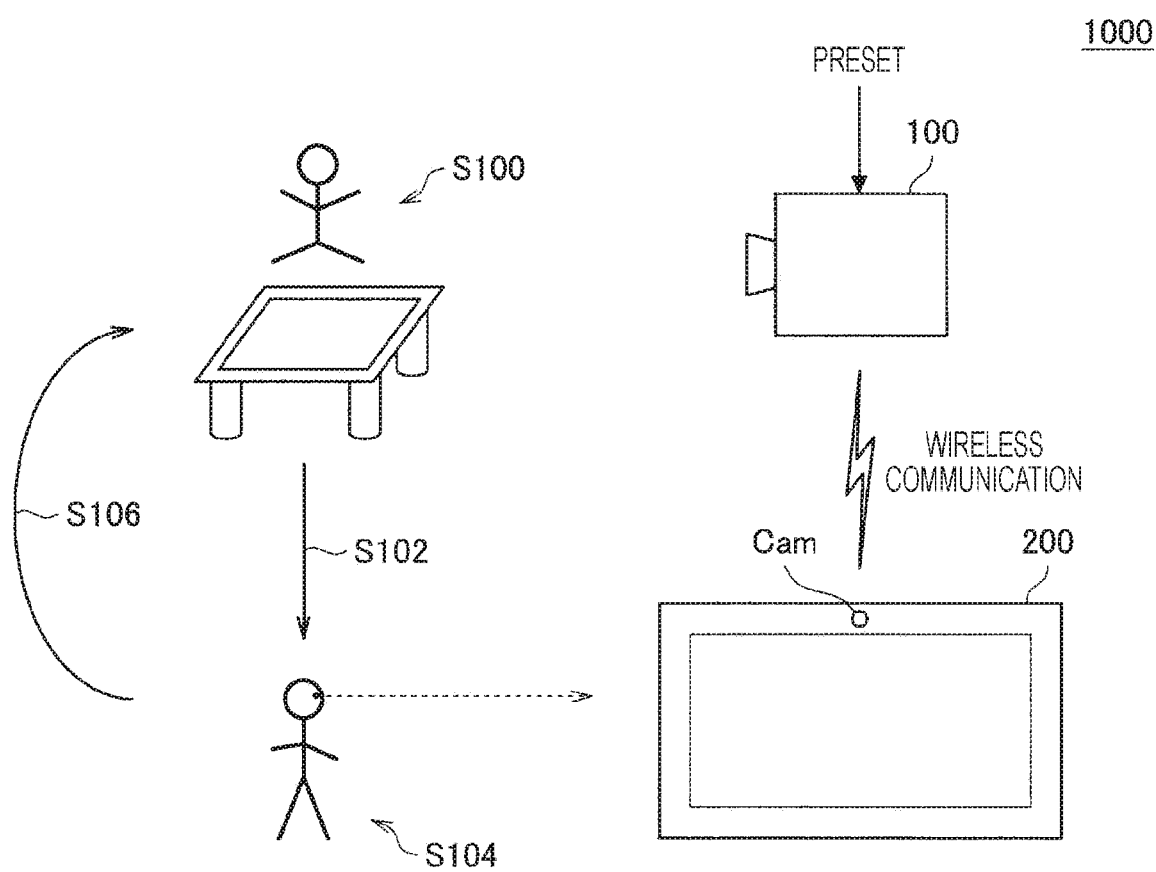
FIG. 4 is an explanatory diagram showing an example of a configuration of a control system according to a second embodiment.

FIG. 4 is an explanatory diagram showing an example of a configuration of a control system 1000 according to a second embodiment. The control system 1000 according to the second embodiment includes an imaging apparatus 100 and a reproducing apparatus 200. An example of a configuration of each of the imaging apparatus 100 and the reproducing apparatus 200 will be described later.

[2-2-1] Imaging Apparatus 100 According to Second Embodiment

The imaging apparatus 100 according to the second embodiment has functions basically similar to those of the imaging apparatus 100 according to the first embodiment described above. Therefore, in the following, in the imaging apparatus 100 according to the second embodiment, a description of points similar to the imaging apparatus 100 according to the first embodiment described above will be omitted, and differences will be described.

The imaging apparatus 100 controls an imaging function in accordance with time setting, and controls a transmission function in conjunction with control of the imaging function.

More specifically, the imaging apparatus 100 controls to start imaging in accordance with the time setting, and controls to start transmission of an image signal on the basis of a captured image generated by imaging being started. The imaging apparatus 100 controls to start transmission of an image signal when a predetermined object is detected from the captured image. That is, the imaging apparatus 100 controls switching between a standby state of the imaging function and an operating state of the imaging function in accordance with the time setting. Furthermore, the imaging apparatus 100 controls switching between a standby state of the transmission function and an operating state of the transmission function in conjunction with control of the imaging function.

Examples of the predetermined object include, for example, any given object set as a detection target including a set body part such as a face, a set mark (including a color pattern), an object of a set shape, and the like.

For example, the imaging apparatus 100 detects a predetermined object by performing any given object detection processing on the captured image. In an example of processing for detecting the face of the person performing practice as an example of the object detection processing, the imaging apparatus 100 detects a moving object from a captured image by taking a difference between a plurality of captured images (for example, a plurality of frame images) that is captured at different time points. Then, the imaging apparatus 100 performs any given face recognition processing such as pattern matching on the detected moving object part, and determines that a predetermined object has been detected when the face of the person performing practice is recognized. Note that the object detection processing in the imaging apparatus 100 is not limited to the example described above. For example, the imaging apparatus 100 performs the face recognition processing on the captured image without detecting the moving object, and may determine that the predetermined object has been detected when the face of the person performing practice is recognized.

After the transmission of the image signal is started, when it is determined that the predetermined object is not detected from the captured image, the imaging apparatus 100 controls to stop imaging and transmission of the image signal. For example, the imaging apparatus 100 may control to stop imaging and transmission of the image signal in synchronization, or may independently control to stop each of imaging and transmission of the image signal.

Here, in a case where it is not determined that a predetermined object has been detected as a result of the above-described object detection processing performed on the captured image, the imaging apparatus 100 controls to stop imaging and controls to stop transmission of the image signal.

Note that the method for determining whether or not the predetermined object has been detected on the basis of the captured image is not limited to the example described above.

For example, the imaging apparatus 100 may determine whether or not the predetermined object has been detected by comparing the captured image with a reference captured image captured when the predetermined object is not included. For example, the imaging apparatus 100 determines that the predetermined object is included when there is a difference between the captured image and the reference captured image, and determines that the predetermined object is not included when there is no difference between the captured image and the reference captured image.

The comparison between the captured image and the reference captured image may be comparison of the entire image, or may be comparison of a partial area of the image (for example, an area having a size set in advance, including a predetermined object portion that has been detected). In a case where the comparison between the captured image and the reference captured image is comparison of a partial area of the image, it is possible to further reduce the power consumption since a processing load is reduced as compared with a case of comparing the entire image. Furthermore, in a case where the comparison between the captured image and the reference captured image is comparison of a partial area of the image, it is possible to improve determination accuracy of whether or not the predetermined object has been detected as compared with a case of comparing the entire image, since there is no influence by a difference in an area other than the partial area.

Figure 5:
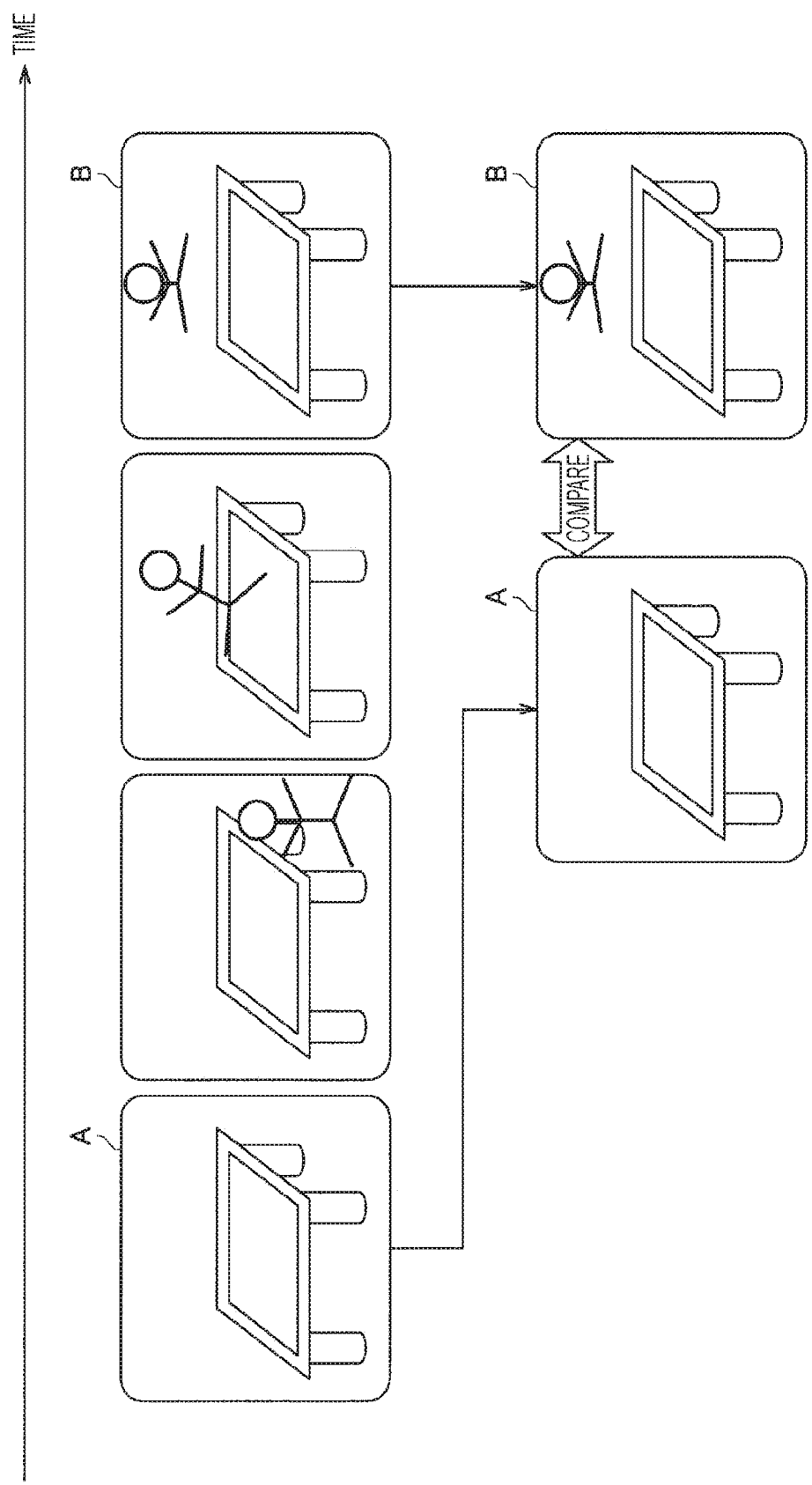
FIG. 5 is an explanatory diagram for explaining an example of processing in an imaging apparatus according to the second embodiment.

FIG. 5 is an explanatory diagram for explaining an example of processing in the imaging apparatus 100 according to the second embodiment, and shows an example of a case where the imaging apparatus 100 determines whether or not the predetermined object has been detected by comparing the entire captured image with the entire reference captured image. An image shown in A of FIG. 5 is an example of the reference captured image, and an image shown in B of FIG. 5 is an example of the captured image (captured image at a time of determination) to be compared with the reference captured image.

In the example shown in FIG. 5, there is a difference between the captured image shown in B of FIG. 5 and the reference captured image shown in A of FIG. 5. Therefore, in the example shown in FIG. 5, the imaging apparatus 100 determines that the predetermined object is included in the captured image shown in B of FIG. 5.

For example, in using a determination method based on comparison between the captured image and the reference captured image as shown with reference to FIG. 5, it is possible to determine that the predetermined object is included in the captured image, for example, even in a case where the predetermined object is not detected by the above-described object detection processing as shown below.

- In a case where the trial includes a performance of standing still in which the face is not captured
- In a case where the trial includes a performance that falls outside an imaging range of the imaging apparatus 100

[2-2-2] Reproducing Apparatus 200 According to Second Embodiment

The reproducing apparatus 200 according to the second embodiment has functions basically similar to those of the reproducing apparatus 200 according to the first embodiment described above. Therefore, in the following, in the reproducing apparatus 200 according to the second embodiment, a description of points similar to the reproducing apparatus 200 according to the first embodiment described above will be omitted, and differences will be described.

The reproducing apparatus 200 controls a reproduction function on the basis of a detection result of a predetermined object.

The reproducing apparatus 200 includes, for example, an imaging device denoted by a reference numeral Cam in FIG. 4, and detects a predetermined object by performing any given object detection processing on a captured image captured by the imaging device. Examples of the imaging device provided to the reproducing apparatus 200 include, for example, an imaging device that captures an image of a front direction of a display screen (for example, a vertical direction with respect to a plane corresponding to the display screen).

In an example of processing for detecting the face of the person performing practice as an example of the object detection processing, the reproducing apparatus 200 performs any given face recognition processing such as pattern matching on a captured image, and determines that a predetermined object has been detected when the face of the person performing practice is recognized. Furthermore, similarly to the imaging apparatus 100 according to the second embodiment, the reproducing apparatus 200 may detect a moving object from a captured image by taking a difference between a plurality of captured images (for example, a plurality of frame images) that is captured at different time points, and perform the face recognition processing on the detected moving object part.

Note that the object detection processing in the reproducing apparatus 200 is not limited to the example described above. For example, the reproducing apparatus 200 may detect a predetermined object on the basis of a detection result of any given sensor that can detect an object, such as an infrared sensor.

More specifically, the reproducing apparatus 200 starts reproduction of a captured image indicated by a buffered image signal when it is determined that the predetermined object has been detected. Furthermore, after the reproduction is started, the reproducing apparatus 200 stops the reproduction of the captured image when it is not determined that the predetermined object has been detected. When it is determined that the predetermined object has been detected, in a case where the captured image being reproduced has been reproduced to the end, the reproducing apparatus 200 may reproduce the captured image again, for example.

Note that the method for the reproducing apparatus 200 to stop reproduction of the captured image is not limited to the example described above. For example, the reproducing apparatus 200 may stop the reproduction of the captured image on the basis of set time setting similarly to the reproducing apparatus 200 according to the first embodiment, even when it is determined that the predetermined object has been detected. Furthermore, even when it is determined that the predetermined object has been detected, the reproducing apparatus 200 may stop the reproduction of the captured image when the captured image being reproduced has been reproduced to the end.

By controlling the reproduction and the stop of the captured image as described above, the reproducing apparatus 200 realizes the following reproduction and stop of the captured image, for example.

- When the face of the person performing practice is recognized from a captured image captured by the imaging device provided to the reproducing apparatus 200, a buffered captured image is automatically reproduced.
- When the face of the person performing practice is no longer recognized from a captured image captured by the imaging device provided to the reproducing apparatus 200, the reproduction of the captured image is automatically stopped.

[2-2-3] Use Case of Control System 1000 According to Second Embodiment

Similarly to FIG. 3, a use case in which the control system 1000 is used for practice of a trampoline is taken as an example.

A person performing practice performs trial for a specified time (S100). After completing the trial, the person performing practice moves to a front of the display screen of the reproducing apparatus 200 (S102).

In the control system 1000, an image signal indicating a captured image received by the reproducing apparatus 200 by wireless communication is buffered, and the reproducing apparatus 200 starts reproduction of the captured image indicated by the buffered image signal when detecting a person performing practice who has moved to a front of the display screen. The person performing practice who has moved to the front of the display screen checks a form and the like by watching the captured image reproduced by the reproducing apparatus 200 and displayed on the display screen (S104).

The person performing practice after watching the reproduced captured image moves to the trampoline in order to perform the trial again (S106). The reproducing apparatus 200 stops the reproduction of the captured image when the person performing practice is no longer detected from the front of the display screen. Then, the person performing practice performs trial for a specified time (S100).

As described above, the imaging apparatus 100 controls the imaging function on the basis of time setting, and controls the transmission function in conjunction with control of the imaging function. Furthermore, the reproducing apparatus 200 controls a reproduction function on the basis of a detection result of a predetermined object. Therefore, the power consumption of each of the imaging apparatus 100 and the reproducing apparatus 200 is reduced from the power consumption of each of the imaging apparatus 60 and the reproducing apparatus 70 shown in FIG. 2. Furthermore, it is possible to realize that "each of the imaging apparatus 100 and the reproducing apparatus 200 continues to operate, for example, until an operation for ending the delayed reproduction is performed" in the control system 1000. Therefore, the control system 1000 can realize "operability for allowing automatic operation and concentration on trial and instructions".

[2-2-4] Example of Effects Exhibited by Control System 1000 According to Second Embodiment A basic configuration of the control system 1000 is similar to the configuration of the system 50 in FIG. 2. Therefore, the control system 1000 can exhibit effects similar to those of the system 50 in FIG. 2.

Furthermore, the imaging apparatus 100 controls the imaging function on the basis of time setting, and controls the transmission function in conjunction with control of the imaging function. The reproducing apparatus 200 controls the reproduction function on the basis of a detection result of a predetermined object. Therefore, the power consumption of each of the imaging apparatus 100 and the reproducing apparatus 200 is reduced from the power consumption of each of the imaging apparatus 60 and the reproducing apparatus 70 shown in FIG. 2.

Furthermore, by reducing the power consumption of each of the imaging apparatus 100 and the reproducing apparatus 200, a person who uses the control system 1000 according to the second embodiment can use the control system 1000 for a longer time than a case of using the system 50 in FIG. 2, even in a case where each of the imaging apparatus 100 and the reproducing apparatus 200 operates with an internal power supply.

Moreover, each of the imaging apparatus 100 and the reproducing apparatus 200 operates on the basis of a detection result of a predetermined object. Therefore, in the control system 1000 according to the second embodiment, a system that does not depend on a delay time for delaying to reproduce the captured image is realized.

Therefore, the control system 1000 according to the second embodiment can realize delayed reproduction with further improved convenience.

[3] Configuration of imaging apparatus 100 and reproducing apparatus 200 included in control system according to present embodiment Next, a description is given to an example of a configuration of the imaging apparatus 100 and the reproducing apparatus 200 included in the control system according to the present embodiment described above.

[3-1] Imaging Apparatus 100

[3-1-1] Configuration Example of Imaging Apparatus 100

Figure 6:
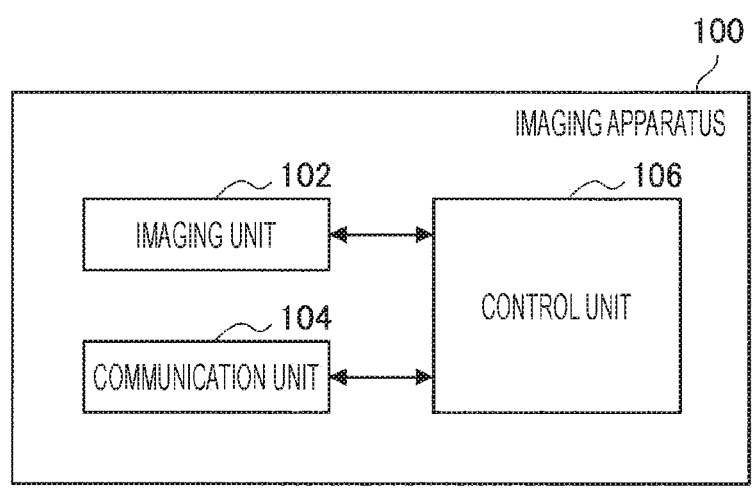
FIG. 6 is a block diagram showing an example of a configuration of the imaging apparatus according to the present embodiment.

FIG. 6 is a block diagram showing an example of a configuration of the imaging apparatus 100 according to the present embodiment. The imaging apparatus 100 includes, for example, an imaging unit 102, a communication unit 104 (imaging-apparatus-side communication unit), and a control unit 106 (imaging-apparatus-side control unit).

Furthermore, the imaging apparatus 100 may include, for example, a read only memory (ROM) (not shown), a random access memory (RAM) (not shown), a storage unit (not shown), an operation unit (not shown) that can be operated by a user of the imaging apparatus 100, a display unit (not shown) that displays various screens on a display screen, and he like. The imaging apparatus 100 connects each of the above-described components by a bus as a data transmission path, for example.

The ROM (not shown) stores control data such as a program and calculation parameters to be used by the control unit 106. The RAM (not shown) temporarily stores a program to be executed by the control unit 106.

The storage unit (not shown) is storage means provided to the imaging apparatus 100, and stores, for example, various data such as data related to a control method in the imaging apparatus 100 such as data indicating time setting, and various applications. Here, examples of the storage unit (not shown) include, for example, a magnetic recording medium such as a hard disk, a non-volatile memory such as a flash memory, and the like. Furthermore, the storage unit (not shown) may be attachable to and detachable from the imaging apparatus 100.

Examples of the operation unit (not shown) include an operation input device to be described later. Furthermore, examples of the display unit (not shown) include a display device to be described later. Note that the imaging apparatus 100 need not include one or both of the operation unit (not shown) and the display unit (not shown).

Hardware Configuration Example of Imaging Apparatus 100

Figure 7:
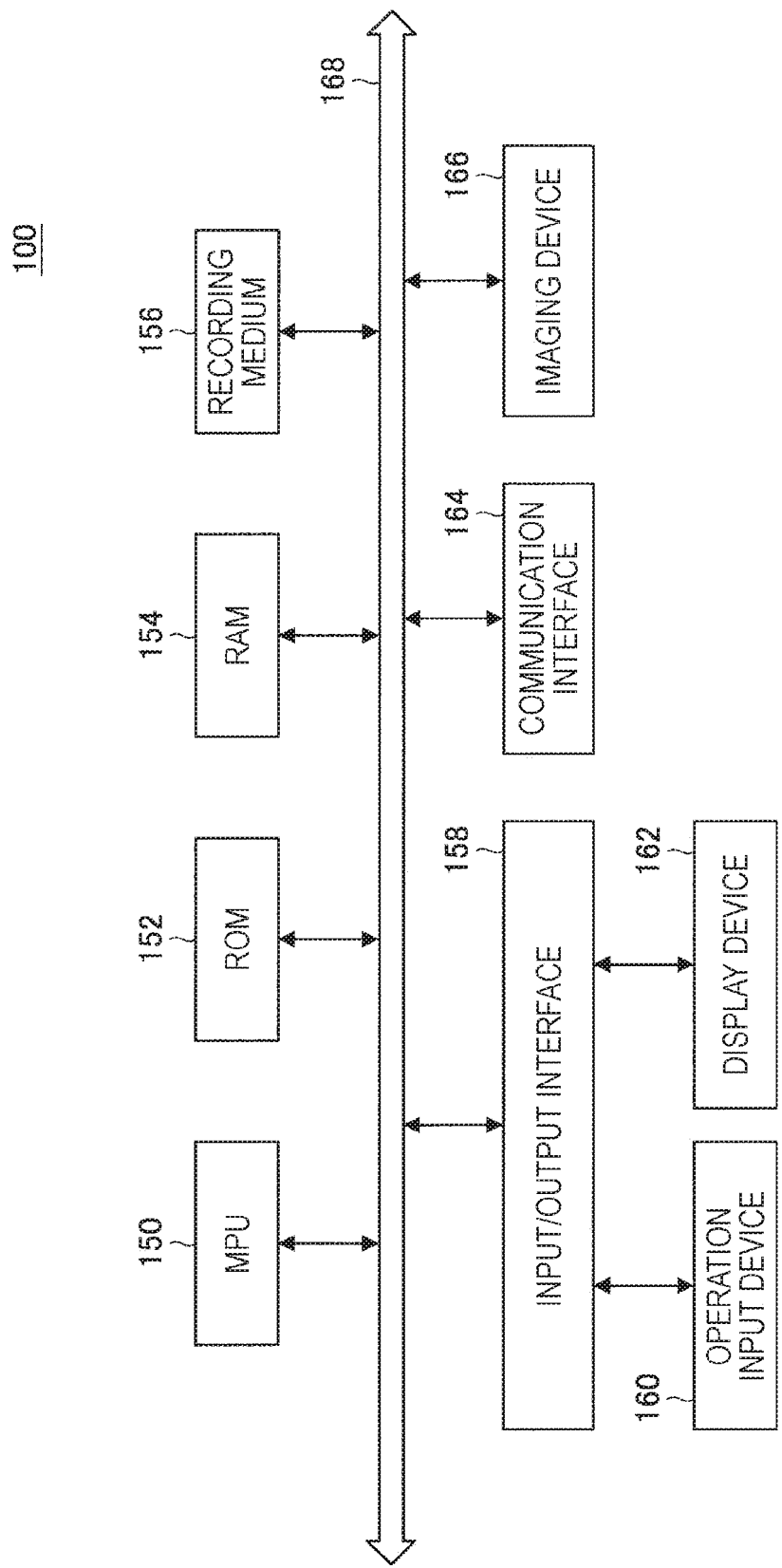
FIG. 7 is an explanatory diagram showing an example of a hardware configuration of the imaging apparatus according to the present embodiment.

FIG. 7 is an explanatory diagram showing an example of a hardware configuration of the imaging apparatus 100 according to the present embodiment. The imaging apparatus 100 includes, for example, an MPU 150, a ROM 152, a RAM 154, a recording medium 156, an input/output interface 158, an operation input device 160, a display device 162, a communication interface 164, and an imaging device 166. Furthermore, the imaging apparatus 100 connects each component with a bus 168 as a data transmission path, for example. Furthermore, the imaging apparatus 100 is driven by, for example, power supplied from an internal power source such as a battery provided to the imaging apparatus 100, power supplied from a connected external power source, and the like.

The MPU 150 includes, for example, one or more processors configured with an arithmetic circuit such as a micro processing unit (MPU), various processing circuits, and the like, and functions as the control unit 106 that controls the entire imaging apparatus 100. Furthermore, the MPU 150 serve to perform processing related to the control method in the imaging apparatus 100. Note that the processing related to the control method in the imaging apparatus 100 may be performed by a processor separate from the MPU 150.

The ROM 152 stores control data and the like such as a program and calculation parameters to be used by the MPU 150. The RAM 154 temporarily stores, for example, a program to be executed by the MPU 150.

The recording medium 156 functions as a storage unit (not shown), and stores, for example, various data such as data related to the control method in the imaging apparatus 100 such as data indicating time setting, and various applications. Here, examples of the recording medium 156 include, for example, a magnetic recording medium such as a hard disk, and a non-volatile memory such as a flash memory. Furthermore, the recording medium 156 may be attachable to and detachable from the imaging apparatus 100.

The input/output interface 158 connects, for example, the operation input device 160 and the display device 162. Furthermore, the operation input device 160 functions as an operation unit (not shown), and the display device 162 functions as a display unit (not shown). Here, examples of the input/output interface 158 include, for example, a universal serial bus (USB) terminal, a digital visual interface (DVI) terminal, a high-definition multimedia interface (HDMI, registered trademark) terminal, various processing circuits, and the like.

For example, the operation input device 160 is provided on the imaging apparatus 100, and is connected to the input/output interface 158 inside the imaging apparatus 100. Examples of the operation input device 160 include, for example, a button, a direction key, a rotary selector such as a jog dial, a combination thereof, and the like.

For example, the display device 162 is provided on the imaging apparatus 100, and is connected to the input/output interface 158 inside the imaging apparatus 100. Examples of the display device 162 include, for example, a liquid crystal display, an organic EL display (or also referred to as an organic light-emitting diode display (OLED display)), and the like.

Note that, it is needless to say that the input/output interface 158 can be connected to an external device such as an operation input device (for example, a keyboard, a mouse, or the like) external to the imaging apparatus 100, or an external display device. Furthermore, the display device 162 may be a device capable of displaying and operating, such as a touch panel, for example.

The communication interface 164 is communication means provided to the imaging apparatus 100, and functions as the communication unit 104 for at least wireless communication with an external device. Here, examples of the communication interface 164 include, for example, a communication device according to any given wireless communication, such as an IEEE802.11 port and a transmission/reception circuit, an IEEE802.15.1 port and a transmission/reception circuit, and a communication antenna and a radio frequency (RF) circuit. Furthermore, the communication interface 164 may have a function of performing any given wired communication, such as a local area network (LAN) terminal and a transmission/reception circuit, for example. Furthermore, the communication interface 164 may have a configuration to be able to communicate with one or more external devices and the like by a plurality of communication methods.

The imaging device 166 functions as the imaging unit 102 that generates a captured image (moving image or still image) by imaging.

The imaging device 166 is configured with, for example, a lens/imaging element and a signal processing circuit. The lens/imaging element is configured with, for example, an optical lens and an image sensor having a plurality of imaging elements. Examples of the imaging element (not shown) include, for example, a complementary metal oxide semiconductor (CMOS), a charge coupled device (CCD), or a stack type imaging element configured by stacking another component such as the CCD on the CMOS. The signal processing circuit includes, for example, an automatic gain control (AGC) circuit and an analog to digital converter (ADC), and converts an analog signal generated by the imaging element into a digital signal (image data).

The imaging apparatus 100 performs processing related to the control method in the imaging apparatus 100, for example, with the configuration shown in FIG. 7.

Note that the hardware configuration of the imaging apparatus 100 according to the present embodiment is not limited to the configuration shown in FIG. 7.

For example, in a case where the imaging apparatus 100 controls an external imaging device and performs processing on the basis of a captured image captured by the external imaging device, the imaging apparatus 100 can have a configuration that does not include the imaging device 166 shown in FIG. 7. In this case, the imaging apparatus 100 functions as an imaging control apparatus that controls the external imaging device.

Furthermore, the imaging apparatus 100 can have a configuration that does not include, for example, one or more of the recording medium 156, the operation input device 160, the display device 162, and the communication interface 164 shown in FIG. 7.

Furthermore, the imaging apparatus 100 can have a configuration according to an application example of the imaging apparatus 100 described later, for example.

Furthermore, for example, the configuration shown in FIG. 7 (or a configuration according to a modified example) may be realized by one or more integrated circuits (ICs).

With reference to FIG. 6 again, an example of the configuration of the imaging apparatus 100 will be described. The imaging unit 102 is imaging means provided to the imaging apparatus 100, and generates a captured image by imaging. The imaging of the imaging unit 102 is controlled by the control unit 106, for example. Examples of the imaging unit 102 include, for example, the imaging device 166 shown in FIG. 7.

The communication unit 104 is communication means provided to the imaging apparatus 100, and has at least a function of performing wireless communication. The communication of the communication unit 104 is controlled by the control unit 106, for example. Examples of the communication unit 104 include, for example, the communication interface 164 shown in FIG. 7.

The control unit 106 is configured with, for example, an MPU and the like, and serves to control the entire imaging apparatus 100. Furthermore, the control unit 106 takes a leading role to perform processing related to the control method in the imaging apparatus 100.

More specifically, for example, as shown in [2-1-1] described above, on the basis of time setting set in advance, the control unit 106 controls the imaging function and controls the transmission function for transmitting an image signal indicating a captured image. By "the control unit 106 controlling the imaging function and the transmission function on the basis of the time setting", the control system 1000 according to the first embodiment described above can be realized.

Furthermore, for example, as shown in [2-2-1] described above, the control unit 106 may control the imaging function on the basis of time setting, and may control the transmission function in conjunction with control of the imaging function. By "the control unit 106 controlling the imaging function on the basis of the time setting, and controlling the transmission function in conjunction with control of the imaging function", the control system 1000 according to the second embodiment described above can be realized.

For example, with the configuration shown in FIG. 6, the imaging apparatus 100 performs the processing according to the first embodiment shown in [2-1-1] described above or the processing according to the second embodiment shown in [2-2-1] described above.

Therefore, for example, delayed reproduction with further improved convenience can be realized by the imaging apparatus 100 having the configuration shown in FIG. 6.

Furthermore, for example, with the configuration shown in FIG. 6, the imaging apparatus 100 can exhibit effects that are exhibited by performing the processing performed in the imaging apparatus 100 as described above (processing related to the control method in the imaging apparatus 100).

Note that the configuration of the imaging apparatus according to the present embodiment is not limited to the configuration shown in FIG. 6.

For example, in a case of controlling an external imaging device having a function and a configuration similar to those of the imaging unit 102, and performing processing on the basis of a captured image captured by the external imaging device, the imaging apparatus according to the present embodiment need not include the imaging unit 102. In this case, the imaging apparatus according to the present embodiment functions as an imaging control apparatus that controls the external imaging device.

Furthermore, for example, in a case of communicating with an external device via an external communication device having a function and a configuration similar to those of the communication unit 104, the imaging apparatus according to the present embodiment need not include the communication unit 104.

[3-1-2] Application Example of Imaging Apparatus Included in control system according to present embodiment Although a description has been given with the imaging apparatus taken as a component of the control system according to the present embodiment above, the present embodiment is not limited to this form. The imaging apparatus according to the present embodiment can be applied to, for example, any device capable of performing at least the processing performed in the imaging apparatus 100 described above (processing related to the control method in the imaging apparatus 100), including "a camera such as a digital still camera or a digital video camera", "a tablet-type device", "a game machine", "a communication device such as a smartphone", "a computer such as a personal computer (PC)" and the like.

[3-2] Reproducing Apparatus 200
[3-2-1] Example Configuration of Reproducing Apparatus 200

Figure 8:
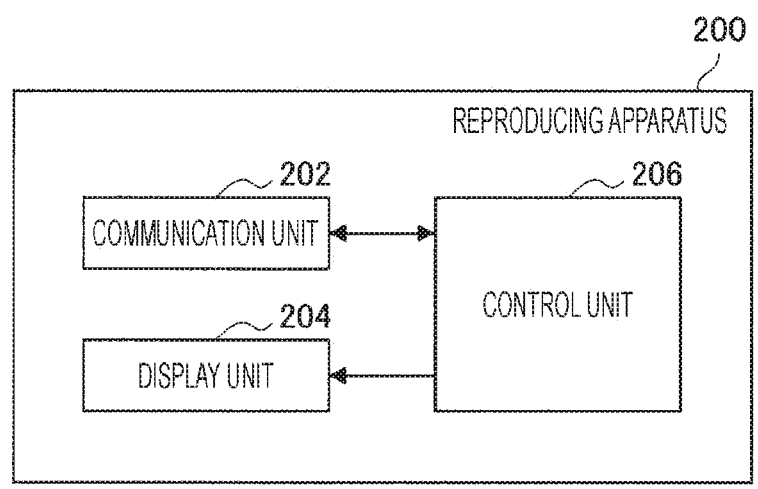
FIG. 8 is a block diagram showing an example of a configuration of a reproducing apparatus according to the present embodiment.

FIG. 8 is a block diagram showing an example of a configuration of the reproducing apparatus 200 according to the present embodiment. The reproducing apparatus 200 includes, for example, a communication unit 202 (reproducing-apparatus-side communication unit), a display unit 204, and a control unit 206 (reproducing-apparatus-side control unit).

Furthermore, the reproducing apparatus 200 may include, for example, a ROM (not shown), a RAM (not shown), a storage unit (not shown), an operation unit (not shown) that can be operated by a user of the reproducing apparatus 200, an imaging unit (not shown) that performs imaging, and the like. The reproducing apparatus 200 connects each of the above-described components by a bus as a data transmission path, for example.

The ROM (not shown) stores control data such as a program and calculation parameters to be used by the control unit 206. The RAM (not shown) temporarily stores a program to be executed by the control unit 206.

The storage unit (not shown) is storage means provided to the reproducing apparatus 200, and stores, for example, various data such as data related to a control method in the reproducing apparatus 200 such as data indicating time setting, and various applications. Here, examples of the storage unit (not shown) include, for example, a magnetic recording medium such as a hard disk, a non-volatile memory such as a flash memory, and the like. Furthermore, the storage unit (not shown) may be attachable to and detachable from the reproducing apparatus 200.

Examples of the operation unit (not shown) include an operation input device to be described later. Furthermore, examples of the imaging unit (not shown) include an imaging device to be described later. Note that the reproducing apparatus 200 need not include one or both of the operation unit (not shown) and the imaging unit (not shown).

Hardware Configuration Example of Reproducing Apparatus 200

Figure 9:
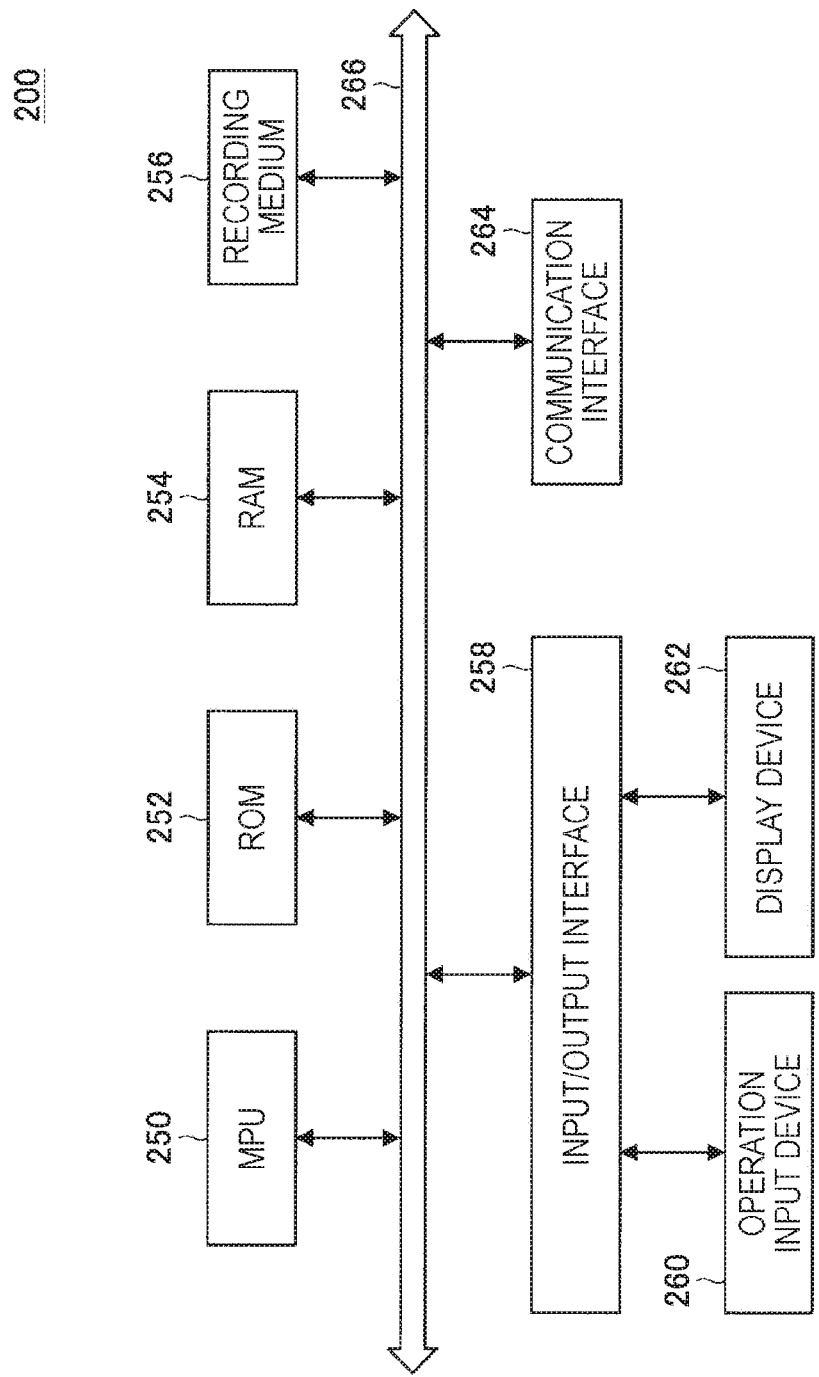
FIG. 9 is an explanatory diagram showing an example of a hardware configuration of the reproducing apparatus according to the present embodiment.

FIG. 9 is an explanatory diagram showing an example of a hardware configuration of the reproducing apparatus 200 according to the present embodiment. The reproducing apparatus 200 includes, for example, an MPU 250, a ROM 252, a RAM 254, a recording medium 256, an input/output interface 258, an operation input device 260, a display device 262, and a communication interface 264. Furthermore, the reproducing apparatus 200 connects each component with a bus 266 as a data transmission path, for example. Furthermore, the reproducing apparatus 200 is driven by, for example, power supplied from an internal power source such as a battery provided to the reproducing apparatus 200, power supplied from a connected external power source, and the like.

The MPU 250 includes, for example, one or more processors configured with an arithmetic circuit such as an MPU, various processing circuits, and the like, and functions as a control unit (not shown) that controls the entire reproducing apparatus 200.

The ROM 252 stores control data and the like such as a program and calculation parameters to be used by the MPU 250. The RAM 254 temporarily stores, for example, a program to be executed by the MPU 250.

The recording medium 256 functions as a storage unit (not shown), and stores, for example, various data such as data related to the control method in the reproducing apparatus 200 such as data indicating time setting, and various applications. Here, examples of the recording medium 256 include, for example, a magnetic recording medium such as a hard disk, a non-volatile memory such as a flash memory, and the like. Furthermore, the recording medium 256 may be attachable to and detachable from the reproducing apparatus 200.

The input/output interface 258 connects, for example, the operation input device 260 and the display device 262. The operation input device 260 functions as an operation unit (not shown), and the display device 262 functions as the display unit 204. Here, examples of the input/output interface 258 include, for example, a USB terminal, a DVI terminal, an HDMI (registered trademark) terminal, various processing circuits, and the like.

Furthermore, for example, the operation input device 260 is provided on the reproducing apparatus 200, and is connected to the input/output interface 258 inside the reproducing apparatus 200. Examples of the operation input device 260 include, for example, a button, a direction key, a rotary selector such as a jog dial, a combination thereof, and the like.

Furthermore, for example, the display device 262 is provided on the reproducing apparatus 200, and is connected to the input/output interface 258 inside the reproducing apparatus 200. Examples of the display device 262 include, for example, a liquid crystal display and an organic EL display.

Note that, it is needless to say that the input/output interface 258 can be connected to an external device such as an operation input device (for example, a keyboard, a mouse, or the like) external to the reproducing apparatus 200, or an external display device. Furthermore, the display device 262 may be, for example, a device capable of displaying and operating, such as a touch panel.

The communication interface 264 is communication means provided to the reproducing apparatus 200, and functions as the communication unit 202. A communication method of the communication interface 264 corresponds to, for example, a communication method of communication for the imaging apparatus 100 to transmit an image signal or the like. Examples of the communication interface 264 include, for example, an IEEE 802.11 port and a transmission/reception circuit, an IEEE 802.15.1 port and a transmission/reception circuit, and the like. Furthermore, the communication interface 264 may have a configuration to be able to communicate with one or more external devices and the like by a plurality of communication methods.

The reproducing apparatus 200 performs processing related to the control method in the reproducing apparatus 200, for example, with the configuration shown in FIG. 9.

Note that the hardware configuration of the reproducing apparatus 200 according to the present embodiment is not limited to the configuration shown in FIG. 9.

For example, the reproducing apparatus 200 need not include the communication interface 264 in a case of communicating with an external device or the like via a connected external communication device. Furthermore, the communication interface 264 may have a configuration to be able to communicate with one or more external devices and the like by a plurality of communication methods.

Furthermore, for example, in a case of being configured to display an image on a connected external display device, the reproducing apparatus 200 need not include the display device 262.

Furthermore, the reproducing apparatus 200 can have a configuration that does not include one or both of the recording medium 256 and the operation input device 260, for example.

Furthermore, the reproducing apparatus 200 can have a configuration according to an application example of the reproducing apparatus 200 described later, for example.

Furthermore, for example, a part or all of the configuration shown in FIG. 9 (or the configuration according to a modified example) may be realized by one or more ICs.

With reference to FIG. 8 again, an example of a configuration of the reproducing apparatus 200 will be described. The communication unit 202 is communication means provided to the reproducing apparatus 200, and has at least a function of performing wireless communication. The communication of the communication unit 202 is controlled by the control unit 206, for example. Examples of the communication unit 202 include, for example, the communication interface 264 shown in FIG. 8.

The display unit 204 is display means provided to the reproducing apparatus 200, and causes a display screen to display various images such as an image indicated by an image signal received by the communication unit 202 and an image related to a user interface (UI). Examples of the display unit 204 include, for example, the display device 262 shown in FIG. 8.

The control unit 206 is configured with an MPU, for example, and serves to control the entire reproducing apparatus 200. Furthermore, the control unit 206 takes a leading role to perform processing related to the control method in the reproducing apparatus 200.

More specifically, for example, as shown in [2-1-2] described above, the control unit 206 controls the reproduction function on the basis of time setting set in advance. By "the control unit 206 controlling the reproduction function on the basis of time setting", the control system 1000 according to the first embodiment described above can be realized.

Furthermore, the control unit 206 may control the reproduction function on the basis of a detection result of a predetermined object, for example, as shown in [2-2-2] described above. By "the control unit 206 controlling the reproduction function on the basis of a detection result of a predetermined object", the control system 1000 according to the second embodiment described above can be realized.

For example, with the configuration shown in FIG. 8, the reproducing apparatus 200 performs the processing according to the first embodiment shown in [2-1-1] described above or the processing according to the second embodiment shown in [2-2-1] described above.

Therefore, for example, delayed reproduction with further improved convenience can be realized by the reproducing apparatus 200 having the configuration shown in FIG. 8.

Furthermore, for example, with the configuration shown in FIG. 8, the reproducing apparatus 200 can exhibit effects that are exhibited by performing the processing performed in the reproducing apparatus 200 as described above (processing related to the control method in the reproducing apparatus 200).

Note that the configuration of the reproducing apparatus according to the present embodiment is not limited to the configuration shown in FIG. 8.

For example, in a case of communicating with an external device via an external communication device having a function and a configuration similar to those of the communication unit 202, the reproducing apparatus according to the present embodiment need not include the communication unit 202.

Furthermore, for example, in a case of a configuration in which an external display device having a function and a configuration similar to those of the display unit 204 is connected, and an image is displayed on the connected external display device, the reproducing apparatus according to the present embodiment need not include the display unit 204.

[3-2-2] Application Example of Reproducing Apparatus Included in Control System According to Present Embodiment Although a description has been given with the reproducing apparatus taken as a component of the control system according to the present embodiment above, the present embodiment is not limited to this form. The imaging apparatus according to the present embodiment can be applied to, for example, any device capable of performing at least the processing performed in the reproducing apparatus 200 described above (processing related to the control method in the reproducing apparatus 200), including "a tablet-type device" "a camera such as a digital still camera or a digital video camera", "a game machine", "a communication device such as a smartphone", "a computers such as a PC", and the like.

[4] Effects Exhibited by Control System According to Present Embodiment

In the control system according to the present embodiment such as the control system according to the first embodiment or the control system according to the second embodiment described above, for example, the following effects are exhibited. Note that, it is needless to say that the effects exhibited by the control system according to the present embodiment are not limited to the examples shown below.

For example, since the control system 1000 can be constructed by a camera (an example of the imaging apparatus 100) sold for consumer use and equipped with a wireless communication function conforming to the IEEE 802.11 standard, and a tablet-type device (an example of the reproducing apparatus 200), a system cost can be reduced.

Since a highly portable and compact system can be configured by utilizing mobile devices such as the camera and the tablet-type device with the wireless communication function described above, it is also possible to support use cases in which the use is difficult with systems installed in a facility, such as outdoor athletics and an expedition destination.

Setting up of each device is simplified by using wireless communication as communication between the imaging apparatus 100 and the reproducing apparatus 200, and an introduction cost of the control system 1000 can be reduced.

In a case where the control system according to the present embodiment takes the configuration of the control system 1000 according to the second embodiment, athletic players and the like can challenge trial at their own timing since the control system according to the present embodiment does not depend on a delay time, and usability is further improved.

In a case where the control system according to the present embodiment takes the configuration of the control system 1000 according to the second embodiment, the imaging apparatus 100 can minimize required periods for imaging and for streaming and transmitting captured images in accordance with a result of detection processing of a predetermined object. Therefore, in the control system according to the present embodiment, it is possible to use for a long time in a mobile environment since the power consumption of the imaging apparatus 100 is reduced, and convenience is improved.

In a case where the control system according to the present embodiment takes the configuration of the control system 1000 according to the second embodiment, the imaging apparatus 100 can control the imaging function and the transmission function by determining a continuation state of trial by comparing a reference captured image and a captured image. Therefore, the control system according to the present embodiment can improve the quality of the system and provide a better user experience.

Program According to Present Embodiment

[I] Program for Functioning as Imaging Apparatus According to Present Embodiment By executing a program for causing a computer to function as the imaging apparatus according to the present embodiment (for example, a program capable of executing processing related to the control method in the imaging apparatus 100, such as the processing in the imaging apparatus 100 shown in [2-1-1] described above, or the processing in the imaging apparatus 100 shown in [2-2-1] described above) with a processor or the like in a computer, a control system capable of realizing delayed reproduction with further improved convenience is realized.

Furthermore, by executing a program for causing a computer to function as the imaging apparatus according to the present embodiment with a processor or the like in the computer, it is possible to exhibit the effects that are exhibited by the processing related to the control method in the imaging apparatus 100 described above.

[II] Program for Functioning as Reproducing Apparatus According to Present Embodiment By executing a program for causing a computer to function as the reproducing apparatus according to the present embodiment (for example, a program capable of executing processing related to the control method in the reproducing apparatus 200, such as the processing in the reproducing apparatus 200 shown in [2-1-1] described above, or the processing in the reproducing apparatus 200 shown in [2-2-1] described above) with a processor or the like in a computer, a control system capable of realizing delayed reproduction with further improved convenience is realized.

Furthermore, by executing a program for causing a computer to function as the reproducing apparatus according to the present embodiment with a processor or the like in the computer, it is possible to exhibit the effects that are exhibited by the processing related to the control method in the reproducing apparatus 200 described above.

The preferred embodiment of the present disclosure has been described above in detail with reference to the accompanying drawings, but the technical scope of the present disclosure is not limited to such examples. It is obvious that those with ordinary skill in the technical field of the present disclosure can arrive various variations or modifications within the scope of the technical idea described in the claims, and it is naturally understood that these also fall within the technical scope of the present disclosure.

For example, in the above, it has been shown that a program (computer program) for causing a computer to function as the imaging apparatus according to the present embodiment is provided, but the present embodiment can also provide a recording medium in which the program is stored. Furthermore, in the above, it has been shown that a program for causing a computer to function as the reproducing apparatus according to the present embodiment is provided, but the present embodiment can also provide a recording medium in which the program is stored.

The configuration described above shows an example of the present embodiment, and naturally belongs to the technical scope of the present disclosure.

Furthermore, the effects described in the present specification are merely exemplary or illustrative, and not restrictive. That is, the technology according to the present disclosure can exhibit other effects apparent to those skilled in the art from the description of the present specification, in addition to the effect described above or instead of the effect described above.

Note that the following configurations are also within the technical scope of the present disclosure.

(1)

An imaging apparatus including:

an imaging unit configured to capture a moving image;

a communication unit configured to perform wireless communication; and a control unit configured to control an imaging function and control a transmission function for transmitting an image signal indicating a captured image that has been captured, on the basis of time setting set in advance, in which the control unit at least controls switching between a standby state where the imaging function is not working and an operating state where the imaging function is working, in accordance with the time setting.

(2)

The imaging apparatus according to (1), in which the control unit controls to start and stop imaging periodically in accordance with the time setting, and controls to start and stop transmission of the image signal periodically in accordance with the time setting.

(3)

The imaging apparatus according to (2), in which the control unit controls to transmit the captured image when controlling to perform imaging, and controls to stop transmission of the image signal when controlling to stop imaging.

(4)

The imaging apparatus according to (1), in which the control unit controls an imaging function in accordance with the time setting, and controls the transmission function in conjunction with control of the imaging function.

(5)

The imaging apparatus according to (4), in which the control unit controls to start imaging in accordance with the time setting, and controls to start transmission of the image signal on the basis of the captured image.

(6)

The imaging apparatus according to (5), in which the control unit controls to start transmission of the image signal when a predetermined object is detected from the captured image.

(7)

The imaging apparatus according to (6), in which, after controlling to start transmission of the image signal, the control unit controls to stop imaging and transmission of the image signal when it is determined that the predetermined object is not detected from the captured image.

(8)

The imaging apparatus according to (7), in which the control unit determines whether or not the predetermined object has been detected by comparing the captured image with a reference captured image captured when the predetermined object is not included.

(9)

The imaging apparatus according to any one of (1) to (7), in which the control unit controls to transmit the image signal that has been compressed.

(10)

A reproducing apparatus including:

a communication unit configured to perform wireless communication;

a display unit capable of displaying an image on a display screen; and a control unit configured to control a reproduction function for reproducing a received image signal and displaying an image on the display screen, on the basis of time setting set in advance or a detection result of a predetermined object.

(11)

The reproducing apparatus according to (10), in which, in a case of controlling the reproduction function on the basis of the time setting, the control unit controls to start and stop reproduction periodically in accordance with the time setting.

(12)

A control method to be executed by an imaging apparatus, the control method including a control step of performing, on the basis of time setting set in advance, control of an imaging function in an imaging unit configured to capture a moving image, and control of a transmission function for transmitting an image signal indicating a captured image that has been captured in a communication unit, in which in the control step, at least switching between a standby state where the imaging function is not working and an operating state where the imaging function is working is controlled in accordance with the time setting.

(13)

A control method to be executed by a reproducing apparatus, the control method including a step of controlling a reproduction function for reproducing an image signal received wirelessly in a communication unit and displaying an image on a display screen of a display unit, on the basis of time setting set in advance or a detection result of a predetermined object.

(14)

A control system including:

an imaging apparatus; and a reproducing apparatus, in which the imaging apparatus includes:

an imaging unit configured to capture a moving image;

an imaging-apparatus-side communication unit configured to perform wireless communication; and an imaging-apparatus-side control unit configured to control an imaging function and control a transmission function for transmitting an image signal indicating a captured image that has been captured, on the basis of time setting set in advance, the imaging-apparatus-side control unit at least controls switching between a standby state where the imaging function is not working and an operating state where the imaging function is working, in accordance with the time setting, and the reproducing apparatus includes:

a reproducing-apparatus-side communication unit configured to perform wireless communication;

a display unit capable of displaying an image on a display screen; and a reproducing-apparatus-side control unit configured to control a reproduction function for reproducing a received image signal and displaying an image on the display screen, on the basis of time setting set in advance or a detection result of a predetermined object.

REFERENCE SIGNS LIST

10, 50 System
20, 60, 100 Imaging apparatus
Buffer device
40, 70, 200 Reproducing apparatus
102 Imaging unit
104, 202 Communication unit
106, 206 Control unit
1000 Control system

The invention claimed is:

1. An imaging apparatus, comprising:
an imaging unit configured to capture a moving image;
a communication unit configured to perform wireless communication; and
a control unit configured to:
control an imaging function of the imaging unit based on a specific time setting;
control a transmission function of the communication unit based on the specific time setting, wherein the transmission function is for transmission of an image signal indicating the captured moving image, and the transmission of the image signal is based on the wireless communication; and switch the imaging unit between a standby state and an operating state based on the specific time setting, wherein the imaging function is not working in the standby state, and the imaging function is working in the operating state.

2. The imaging apparatus according to claim 1, wherein the control unit is further configured to:

control, based on the specific time setting, the imaging unit to periodically start and stop the capture of the moving image; and control, based on the specific time setting, the communication unit to periodically start and stop the transmission of the image signal.

3. The imaging apparatus according to claim 2, wherein the control unit is further configured to:

control, based on a start of the capture of the moving image, the communication unit to transmit the captured moving image; and control, based on a stop of the capture of the moving image, the communication unit to stop the transmission of the image signal.

4. The imaging apparatus according to claim 1, wherein the control unit is further configured to control the transmission function in conjunction with the control of the imaging function.

5. The imaging apparatus according to claim 4, wherein the control unit is further configured to:

control, based on the specific time setting, the imaging unit to start the capture of the moving image; and control, based on the captured moving image, the communication unit to start the transmission of the image signal.

6. The imaging apparatus according to claim 5, wherein the control unit is further configured to:

detect a specific object from the captured moving image; and control, based on the detection of the specific object, the communication unit to start the transmission of the image signal.

7. The imaging apparatus according to claim 6, wherein, after the start of the transmission of the image signal, the control unit is further configured to:

control, in a case where the specific object is undetected from the captured moving image, the imaging unit to stop the capture of the moving image; and control, in the case where the specific object is undetected from the captured moving image, the communication unit to stop the transmission of the image signal.

8. The imaging apparatus according to claim 7, wherein the control unit is further configured to:

compare the captured moving image with a reference captured image, wherein the specific object is absent in the reference captured image; and determine one of a presence or an absence of the specific object in the captured moving image based on the comparison.

9. The imaging apparatus according to claim 1, wherein the control unit is further configured to control the communication unit to transmit the image signal that has been compressed.

10. A reproducing apparatus, comprising:

a communication unit configured to perform wireless communication to receive an image signal;

a display unit configured to display an image on a display screen; and a control unit configured to control, based on a specific time setting, a reproduction function to periodically start and stop reproduction of the received image signal, wherein the display of the image on the display screen is based on the reproduction of the received image signal.

11. A control method, comprising:

in an imaging apparatus comprising a communication unit and an imaging unit:

controlling, based on a specific time setting, an imaging function of the imaging unit;

controlling a transmission function of the communication unit based on the specific time setting, wherein the transmission function is for transmitting an image signal indicating a captured moving image that has been captured by the imaging unit; and switching the imaging unit between a standby state and an operating state based on the specific time setting, wherein the imaging function is not working in the standby state, and the imaging function is working in the operating state.

12. A control method, comprising:

in a reproducing apparatus comprising a control unit, a display unit, and a communication unit:

wirelessly receiving an image signal by the communication unit;

controlling, by the control unit based on a specific time setting, a reproduction function to periodically start and stop reproduction of the received image signal; and displaying, by the display unit, an image on a display screen of the display unit based on the reproduction of the received image signal.

13. A control system, comprising:

an imaging apparatus; and a reproducing apparatus, wherein the imaging apparatus includes:

an imaging unit configured to capture a moving image, an imaging-apparatus-side communication unit configured to perform wireless communication with the reproducing apparatus, and an imaging-apparatus-side control unit configured to:

control an imaging function of the imaging unit based on a specific time setting, control a transmission function of the imaging-apparatus-side communication unit based on the specific time setting, wherein the transmission function is for transmission of an image signal indicating the captured moving image, and the transmission of the image signal is based on the wireless communication, and switch the imaging unit between a standby state and an operating state based on the specific time setting, wherein
the imaging function is not working in the standby state, and
the imaging function is working in the operating state, and the reproducing apparatus includes:
a reproducing-apparatus-side communication unit configured to perform the wireless communication with the imaging-apparatus-side communication unit to receive the image signal,
a display unit configured to display the captured moving capable of displaying an image on a display screen, and
a reproducing-apparatus-side control unit configured to control, based on at least one of the specific time setting or a detection result of a specific object, a reproduction function for reproduction of the received image signal,
wherein the display of the captured moving image on the display screen is based on the reproduction of the received image signal.

\* \* \* \* \*